United States Patent
Ohsawa et al.

(10) Patent No.: US 10,971,726 B2
(45) Date of Patent: Apr. 6, 2021

(54) LITHIUM ION SECONDARY BATTERY AND METHOD FOR MANUFACTURING LITHIUM ION SECONDARY BATTERY

(71) Applicant: TOYOTA JIDOSHA KABUSHIKI KAISHA, Toyota (JP)

(72) Inventors: Ryosuke Ohsawa, Okazaki (JP); Akira Tsujiko, Miyoshi (JP); Kaoru Inoue, Hirakata (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 152 days.

(21) Appl. No.: 16/294,036

(22) Filed: Mar. 6, 2019

(65) Prior Publication Data
US 2019/0280293 A1 Sep. 12, 2019

(30) Foreign Application Priority Data
Mar. 8, 2018 (JP) .............................. JP2018-041433

(51) Int. Cl.
*H01M 4/485* (2010.01)
*H01M 10/0525* (2010.01)
*H01M 4/02* (2006.01)

(52) U.S. Cl.
CPC ....... *H01M 4/485* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| 2015/0147658 A1 | 5/2015 | Nakagaki et al. |
| 2015/0155555 A1* | 6/2015 | Yamamoto ............ H01M 4/505 429/188 |
| 2015/0221951 A1 | 8/2015 | Hashimoto et al. |
| 2016/0285091 A1 | 9/2016 | Iriyama et al. |

FOREIGN PATENT DOCUMENTS

| JP | 2014010890 A | 1/2014 |
| JP | 2014-038794 A | 2/2014 |
| JP | 2017-168466 A | 9/2017 |
| KR | 10-2015-0054914 A | 5/2015 |
| WO | 2014/077113 A1 | 5/2014 |

\* cited by examiner

*Primary Examiner* — Wojciech Haske
(74) *Attorney, Agent, or Firm* — Sughrue Mion, PLLC

(57) ABSTRACT

The positive electrode includes a positive electrode composite layer. The negative electrode includes a negative electrode composite material layer. A whole of the positive electrode composite layer and a portion of the negative electrode composite material layer face each other with the separator being interposed therebetween. The negative electrode composite material layer includes a first region and a second region. The first region is a region that does not face the positive electrode composite layer and that extends from a position facing one end portion of the positive electrode composite layer to a point separated from the position by more than or equal to 0.1 mm and less than or equal to 10 mm. The second region is a region other than the first region. The first region includes silicon oxide doped with lithium. The second region includes silicon oxide.

6 Claims, 5 Drawing Sheets

LITHIUM ION SECONDARY BATTERY AND METHOD FOR MANUFACTURING LITHIUM ION SECONDARY BATTERY

This nonprovisional application is based on Japanese Patent Application No. 2018-041433 filed on Mar. 8, 2018, with the Japan Patent Office, the entire contents of which are hereby incorporated by reference.

BACKGROUND

Field

The present disclosure relates to a lithium ion secondary battery and a method for manufacturing the lithium ion secondary battery.

Description of the Background Art

WO 2014/077113 discloses that silicon oxide ($SiO_x$), which is a negative electrode active material, is doped with lithium before incorporating the negative electrode active material into a lithium ion secondary battery. By using, as the negative electrode active material, the silicon oxide doped with lithium, it is expected to obtain a negative electrode for a lithium ion secondary battery, with which decrease in capacity retention is reduced.

SUMMARY

Current density at each of the both end portions of a positive electrode composite layer in a lithium ion secondary battery tends to be high during initial charging/discharging. Accordingly, deterioration is considered to be progressed at the both end portions of the positive electrode composite layer, thus resulting in decreased positive electrode capacity. It is considered that the decreased positive electrode capacity leads to high current density in the whole of the positive electrode during a charging/discharging cycle. As a result, the positive electrode capacity may be further decreased to result in decreased capacity retention.

A similar phenomenon is considered to occur also in the lithium ion battery including the lithium ion secondary battery negative electrode described in WO 2014/077113. That is, it is considered that there is room for improvement in suppressing decrease in capacity retention in the lithium ion secondary battery including the lithium ion secondary battery negative electrode described in WO 2014/077113.

An object of the present disclosure is to provide a lithium ion secondary battery in which decrease in capacity retention is suppressed and which includes a negative electrode containing silicon oxide doped with lithium.

Hereinafter, the technical configuration, function and effect of the present disclosure will be described. However, a function mechanism of the present disclosure includes presumption. The scope of claims should not be limited depending on whether the function mechanism is correct or incorrect.

[1] A lithium ion secondary battery includes a positive electrode, a negative electrode, and a separator. The positive electrode at least includes a positive electrode composite layer containing a positive electrode active material. The negative electrode at least includes a negative electrode composite material layer containing a negative electrode active material. A whole of the positive electrode composite layer and a portion of the negative electrode composite material layer face each other with the separator being interposed between the positive electrode composite layer and the negative electrode composite material layer. The negative electrode composite material layer includes at least one first region and a second region. The first region is a region that does not face the positive electrode composite layer and that extends from a position facing one end portion of the positive electrode composite layer to a point separated from the position by more than or equal to 0.1 mm and less than or equal to 10 mm. The second region is a region other than the first region. The first region includes, as the negative electrode active material, silicon oxide doped with lithium. The second region includes silicon oxide as the negative electrode active material.

FIG. 1 is a cross sectional conceptual view for illustrating the function mechanism of the present disclosure.

FIG. 1 shows a schematic view showing an exemplary configuration of an electrode array 400. Electrode array 400 includes a positive electrode 100, a negative electrode 200, and a separator 300. That is, the lithium ion secondary battery includes positive electrode 100, negative electrode 200, and separator 300. Positive electrode 100 includes a positive electrode composite layer 102 containing a positive electrode active material. Positive electrode composite layer 102 is disposed on a surface of a positive electrode collector 101. Negative electrode 200 includes a negative electrode composite material layer 202 containing a negative electrode active material. Negative electrode composite material layer 202 is disposed on a surface of a negative electrode collector 201. A whole of positive electrode composite layer 102 and a portion of negative electrode composite material layer 202 face each other with separator 300 being interposed therebetween.

FIG. 4 is a schematic view showing an exemplary configuration of negative electrode 200.

Negative electrode composite material layer 202 is formed to extend in a longitudinal direction LD along the surface of negative electrode collector 201. Negative electrode composite material layer 202 is constituted of two regions. That is, negative electrode composite material layer 202 is formed to include a first region R1 and a second region R2, which is a region other than first region R1, in a width direction WD orthogonal to longitudinal direction LD. That is, negative electrode composite material layer 202 includes at least one first region R1 and second region R2.

As shown in FIG. 1, first region R1 is a region that does not face positive electrode composite layer 102 and that extends from a position A1 facing one end portion 102a of positive electrode composite layer 102 to a point separated from position A1 by X1 mm in width direction WD in negative electrode composite material layer 202. Here, X1 mm is more than or equal to 0.1 mm and less than or equal to 10 mm.

As shown in FIG. 1, the length of negative electrode composite material layer 202 in width direction WD is longer than the length of positive electrode composite layer 102 in width direction WD. That is, the whole of positive electrode composite layer 102 and the portion of negative electrode composite material layer 202 face each other with separator 300 being interposed therebetween.

Negative electrode composite material layer 202 has first region R1 and second region R2, which is a region other than first region R1. First region R1 includes silicon oxide (hereinafter, also simply referred to as "Li-doped SiO") doped with lithium, as the negative electrode active material. In the present specification, the term "dope" means storage, carrying, adsorption, or intercalation. In other words, the term "silicon oxide doped with lithium" means a state in which lithium ions are stored, carried, absorbed, or intercalated in silicon oxide. That is, lithium ions have been already included in first region R1 of negative electrode composite material layer 202 in a stage before initial charging. Accordingly, during the initial charging/discharging, it is considered that current density in one end portion 102a of positive electrode composite layer 102 is reduced. As a result, it is expected that decrease in capacity retention is suppressed.

[2] The negative electrode composite material layer may have two first regions. With two first regions R1, it is expected that the decrease in capacity retention is suppressed significantly.

[3] When viewed in a plan view, the negative electrode composite material layer may have a rectangular shape, and the first region and the second region may extend along a longitudinal direction of the negative electrode composite material layer.

As shown in FIG. 4, when viewed in a plan view, negative electrode composite material layer 202 may have a rectangular shape. By forming first region R1 and second region R2 to extend along longitudinal direction LD of negative electrode composite material layer 202, the area of first region R1 can be sufficiently secured. Accordingly, it is expected that the decrease in capacity retention is suppressed significantly. In the present specification, the expression "when viewed in a plan view" indicates a visual field seen in the normal direction of the main surface of positive electrode composite layer 102 or negative electrode composite material layer 202.

[4] When viewed in a plan view, an area of the negative electrode composite material layer may be larger than an area of the positive electrode composite layer. Accordingly, the capacity of the negative electrode composite material layer can be larger than the capacity of the positive electrode composite layer.

[5] A method for manufacturing the lithium ion secondary battery at least includes (A) to (D) as follows.
(A) The positive electrode described in [1] is prepared.
(B) The negative electrode described in [1] is prepared.
(C) The separator described in [1] is prepared.
(D) A lithium ion secondary battery is assembled which includes the positive electrode described in [1], the negative electrode described in [1], and the separator described in [1].

According to this manufacturing method, the lithium ion secondary battery having the configuration described in [1] can be manufactured.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment (referred to as "the present embodiment" in the present specification) of the present disclosure will be described. However, the description below is not intended to limit the scope of claims.

<Lithium Ion Secondary Battery>

Figure 5:
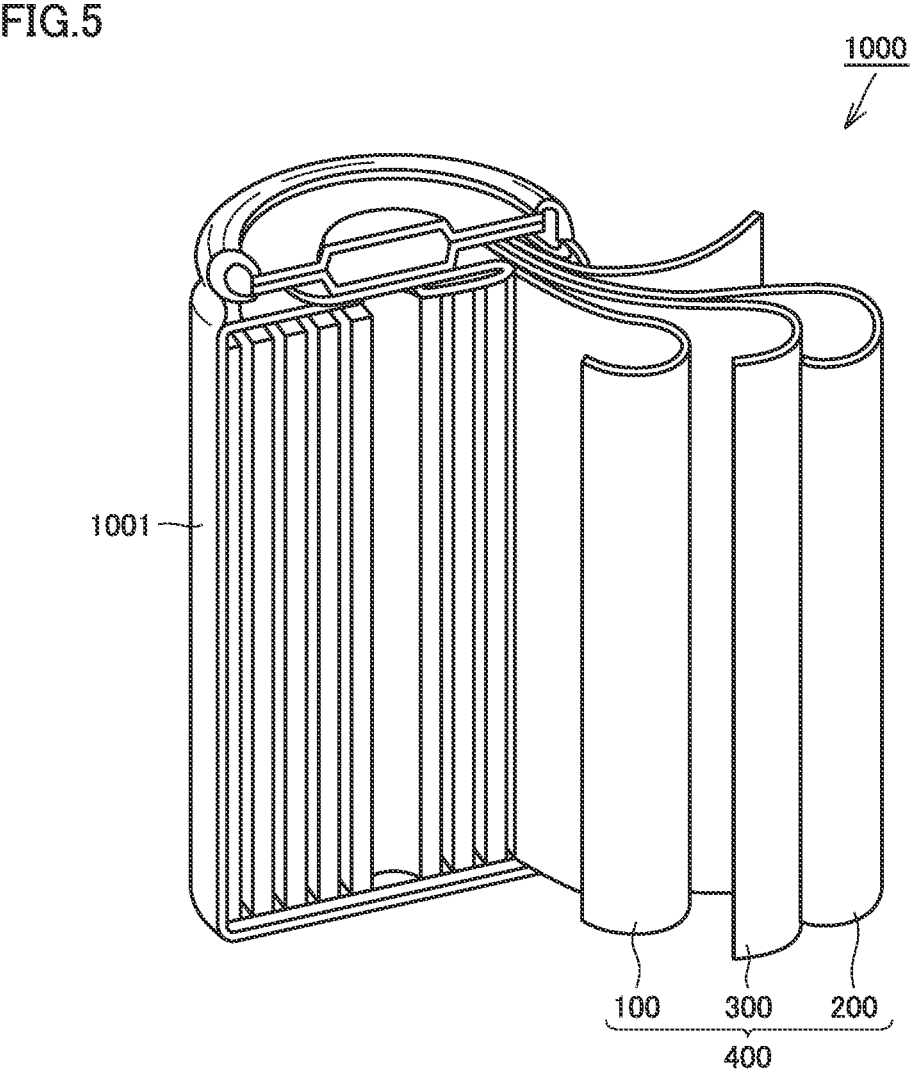
FIG. 5 is a schematic view showing an exemplary configuration of a lithium ion secondary battery in the present embodiment.

FIG. 5 is a schematic view showing an exemplary configuration of the lithium ion secondary battery (hereinafter, also simply referred to as "battery") in the present embodiment.

The outer shape of a battery 1000 is a cylindrical shape. That is, battery 1000 is a cylindrical battery. However, the battery of the present embodiment should not be limited to the cylindrical battery. The battery of the present embodiment may be a prismatic battery, for example.

<<Case>>

Battery 1000 includes a case 1001. Case 1001 is sealed. Case 1001 can be composed of an aluminum (Al) alloy or the like, for example. However, as long as case 1001 can be sealed, case 1001 may be a pouch composed of an Al laminate film or the like, for example. That is, the battery of the present embodiment may be a laminate type battery. Case 1001 may be provided with a current interrupt device (CID), an injection opening, a gas exhaust valve, and the like (all of which are not shown in the figures), for example.

<<Electrode Array>>

Figure 2:
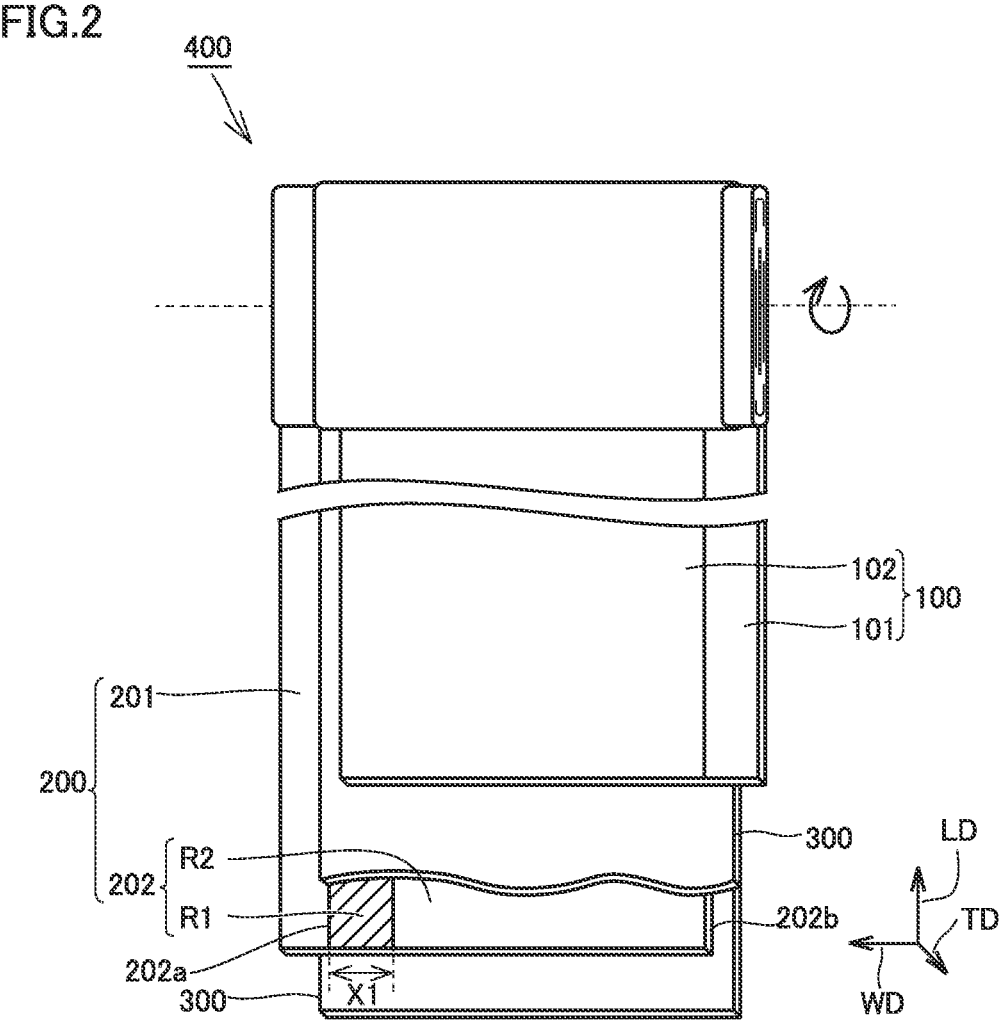
FIG. 2 is a schematic view showing an exemplary configuration of an electrode array of the present embodiment.

FIG. 2 is a schematic view showing an exemplary configuration of an electrode array of the present embodiment.

Electrode array 400 is of winding type. That is, electrode array 400 is formed by: layering a positive electrode 100, a separator 300, a negative electrode 200, and a separator 300 in this order; and winding them in the form of a spiral. However, the electrode array of the present embodiment should not be limited to the winding type. The electrode array of the present embodiment may be of a stack type. The stack type electrode array can be formed by alternately stacking positive electrode 100 and negative electrode 200 with separator 300 being interposed between positive electrode 100 and negative electrode 200, for example.

<Positive Electrode>

Figure 3:
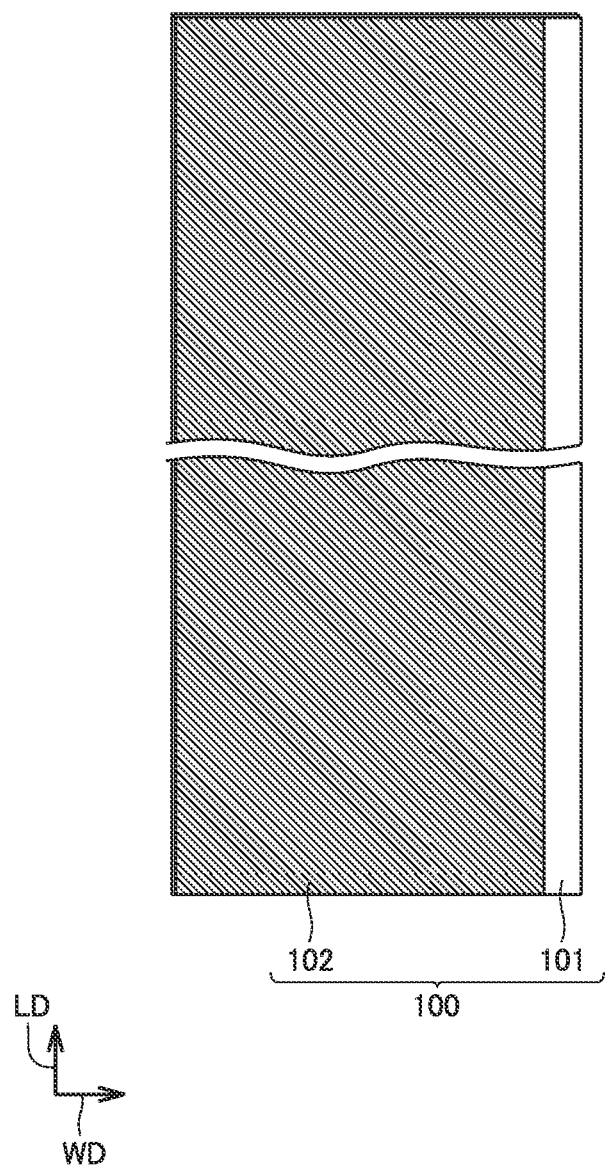
FIG. 3 is a schematic view showing an exemplary configuration of a positive electrode of the present embodiment.

FIG. 3 is a schematic view showing an exemplary configuration of positive electrode 100 of the present embodiment.

Positive electrode 100 may be a sheet in the form of a strip. Positive electrode 100 includes a positive electrode collector 101 and a positive electrode composite layer 102. Positive electrode composite layer 102 is formed on a main surface of positive electrode collector 101. Positive electrode composite layer 102 contains a positive electrode active material. That is, positive electrode 100 at least includes positive electrode composite layer 102 containing the positive electrode active material. Positive electrode collector 101 may be an aluminum (Al) foil or the like, for example. Positive electrode collector 101 may have a thickness of 10 to 30 μm, for example.

When viewed in a plan view, positive electrode composite layer 102 may have a rectangular shape.

<<Positive Electrode Composite Layer>>

Positive electrode composite layer 102 includes the positive electrode active material, a conductive material, and a binder. Positive electrode composite layer 102 may include 80 to 98 weight % of the positive electrode active material, 1 to 15 weight % of the conductive material, and 1 to 5 weight % of the binder, for example. Positive electrode composite layer 102 may have a thickness of 100 to 200 μm, for example.

(Positive Electrode Active Material, Conductive Material, and Binder)

The positive electrode active material, the conductive material, and the binder should not be limited particularly. Examples of the positive electrode active material may include $LiCoO_2$, $LiNiO_2$, $LiNi_{1/3}Co_{1/3}Mn_{1/3}O_2$ (NCM), $LiNi_{0.8}Co_{0.15}Al_{0.05}O_2$ (NCA), $LiMnO_2$, $LiMn_2O_4$, $LiFePO_4$, and the like. Examples of the conductive material may include acetylene black (AB), furnace black, vapor growth carbon fiber (VGCF), graphite and the like. Examples of the binder may include polyvinylidene difluoride (PVdF), styrene butadiene rubber (SBR), polytetrafluoroethylene (PTFE) and the like.

<Negative Electrode>

Figure 4:
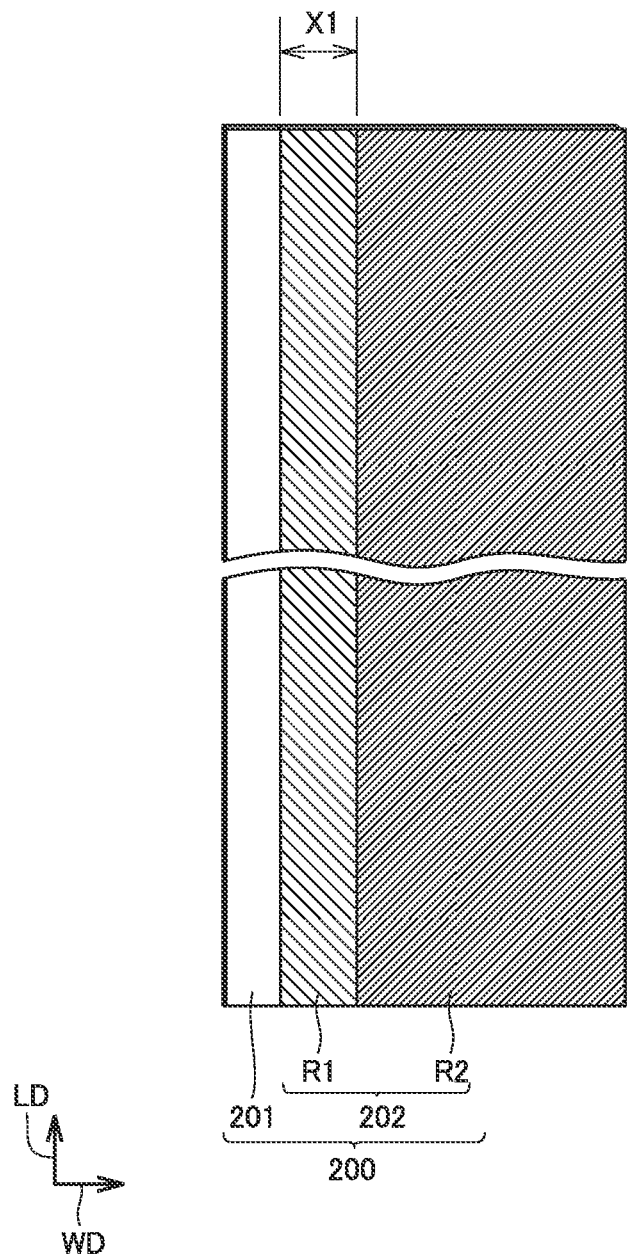
FIG. 4 is a schematic view showing an exemplary configuration of a negative electrode of the present embodiment.

FIG. 4 is a schematic view showing an exemplary configuration of negative electrode 200 of the present embodiment.

Figure 1:
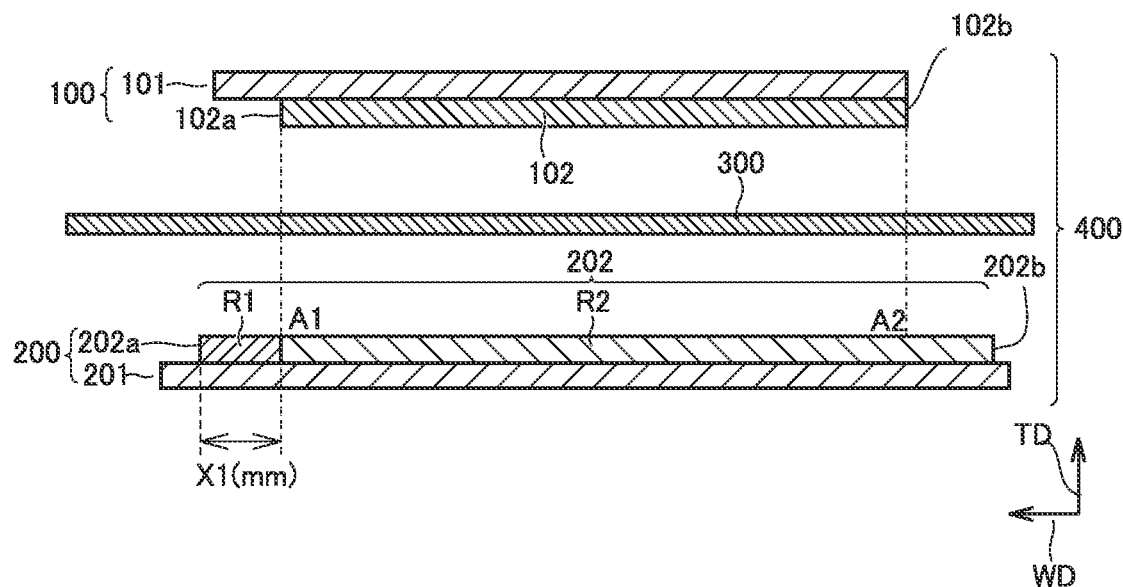
FIG. 1 is a cross sectional conceptual view for illustrating a function mechanism of the present disclosure.

Negative electrode 200 may be a sheet in the form of a strip. Negative electrode 200 includes a negative electrode composite material layer 202. Negative electrode composite material layer 202 is formed on a surface of negative electrode collector 201. Negative electrode composite material layer 202 includes a negative electrode active material. That is, negative electrode 200 at least includes negative electrode composite material layer 202 containing the negative electrode active material. As shown in FIG. 1, a portion of negative electrode composite material layer 202 faces positive electrode composite layer 102 with below-described separator 300 being interposed therebetween. That is, a whole of positive electrode composite layer 102 and a portion of negative electrode composite material layer 202 face each other with separator 300 being interposed therebetween. When viewed in a plan view, negative electrode composite material layer 202 may have a rectangular shape.

<<Negative Electrode Composite Material Layer>>

Negative electrode composite material layer 202 includes the negative electrode active material and a binder. Negative electrode composite material layer 202 may include 95 to 99 mass % of the negative electrode active material and 1 to 5 mass % of the binder, for example. As a conductive aid, negative electrode composite material layer 202 may further include acetylene black (AB), Ketchen black, carbon black, or the like. Negative electrode composite material layer 202 may have a thickness of about 50 to 150 μm, for example. When viewed in a plan view, the area of negative electrode composite material layer 202 is desirably larger than the area of positive electrode composite layer 102.

As shown in FIG. 1, negative electrode composite material layer 202 includes a first region R1, and a second region R2, which is a region other than first region R1. First region R1 is a region that does not face positive electrode composite layer 102 and that extends from a position A1 facing one end portion 102a of positive electrode composite layer 102 to a point separated from position A1 by more than or equal to 0.1 mm and less than or equal to 10 mm (X1 mm). Negative electrode composite material layer 202 may have two first regions R1. For example, as first region R1, negative electrode composite material layer 202 may further include a region that extends from a position A2 facing the other end portion 102b of positive electrode composite layer 102 to a point separated from position A2 by more than or equal to 0.1 mm and less than or equal to 10 mm (X1 mm).

As shown in FIG. 4, when viewed in a plan view, negative electrode composite material layer 202 desirably has a rectangular shape. First region R1 and second region R2 desirably extend along a longitudinal direction LD of negative electrode composite material layer 202. The following describes each of the regions and a method for forming each of the regions.

<<First Region>>

As shown in FIG. 1, first region R1 is a region that does not face positive electrode composite layer 102 and that extends from position A1 facing one end portion 102a of positive electrode composite layer 102 to the point separated from position A1 by more than or equal to 0.1 mm and less than or equal to 10 mm (X1 mm). If first region R1 is a region extending from A1 to a point separated from A1 by less than 0.1 mm, decrease in capacity retention may be insufficiently suppressed. If first region R1 is a region extending from A1 to a point separated from A1 by more than 10 mm, a ratio of Li-doped SiO included in negative electrode composite material layer 202 becomes large, with the result that the capacity of the battery may become low.

In FIG. 1, first region R1 represents a region of negative electrode composite material layer 202 extending from A1 to one end portion 202a of negative electrode composite material layer 202 (X1 mm); however, this is just an example. First region R1 may be a region of negative electrode composite material layer 202 extending from A1 to a point separated from A1 by more than or equal to 0.1 mm and less than or equal to 10 mm along a direction toward the other end portion 202b of negative electrode composite material layer 202. That is, a third region R3 (not shown) may be provided between first region R1 and one end portion 202a of negative electrode composite material layer 202. The composition of the negative electrode composite material layer disposed in third region R3 is desirably the same as the composition of the below-described negative electrode composite material layer disposed in first region R1.

(Negative Electrode Active Material Included in First Region)

First region R1 includes Li-doped SiO as the negative electrode active material. The Li-doped SiO may be prepared in accordance with the description of the below-described section of Examples, for example. Exemplary Li-doped SiO that may be used herein is Li-doped SiO in which a ratio of P1/P2 is more than or equal to 0.1, where P1 represents a peak height resulting from $LiSi_2O_5$ in which 2θ appears between 24.5° and 25° and P2 represents a peak height resulting from Si in which 2θ appears between 45° and 50° in an X-ray diffraction pattern obtained by measuring the Li-doped SiO using an X-ray diffraction (XRD) instrument employing a CuKα ray. The XRD measurement method can be performed in accordance with a method described in the Examples below.

For the negative electrode active material used in first region R1, only the Li-doped SiO may be used or a mixture of the Li-doped SiO and a negative electrode active material such as graphite may be used. For example, for the negative electrode active material included in first region R1, a mixture of the Li-doped SiO and artificial graphite, soft carbon, hard carbon, or the like may be used.

(Binder Included in First Region)

The binder included in first region R1 should not be limited particularly. Examples of the binder included in first region R1 may include carboxymethylcellulose (CMC), styrene butadiene rubber (SBR), polyimide (PI), and the like. These binders may be used solely or two or more of them may be mixed and used.

<<Second Region>>

As shown in FIG. 1, second region R2 is a region other than first region R1. Second region R2 contains the negative electrode active material and the binder.

(Negative Electrode Active Material Included in Second Region)

Second region R2 at least includes silicon oxide as the negative electrode active material. That is, second region R2 includes silicon oxide as the negative electrode active material. Second region R2 does not include the Li-doped SiO as the negative electrode active material. For the negative electrode active material used in second region R2, only silicon oxide may be used or a mixture of silicon oxide and a negative electrode active material such as graphite may be used. For example, for the negative electrode active material included in second region R2, a mixture of silicon oxide and artificial graphite, soft carbon, hard carbon, or the like may be used.

(Binder Included in Second Region)

The binder included in second region R2 should not be limited particularly. Examples of the binder included in second region R2 may include CMC, SBR, polyimide, and the like. These binders may be used solely or two or more of them may be mixed and used. The binder included in second region R2 may be the same as the binder included in first region R1, or may be different from the binder included in first region R1. In consideration of productivity, the binder included in first region R1 and the binder included in second region R2 are desirably the same.

<Method for Forming Each Region>

Figure 6:
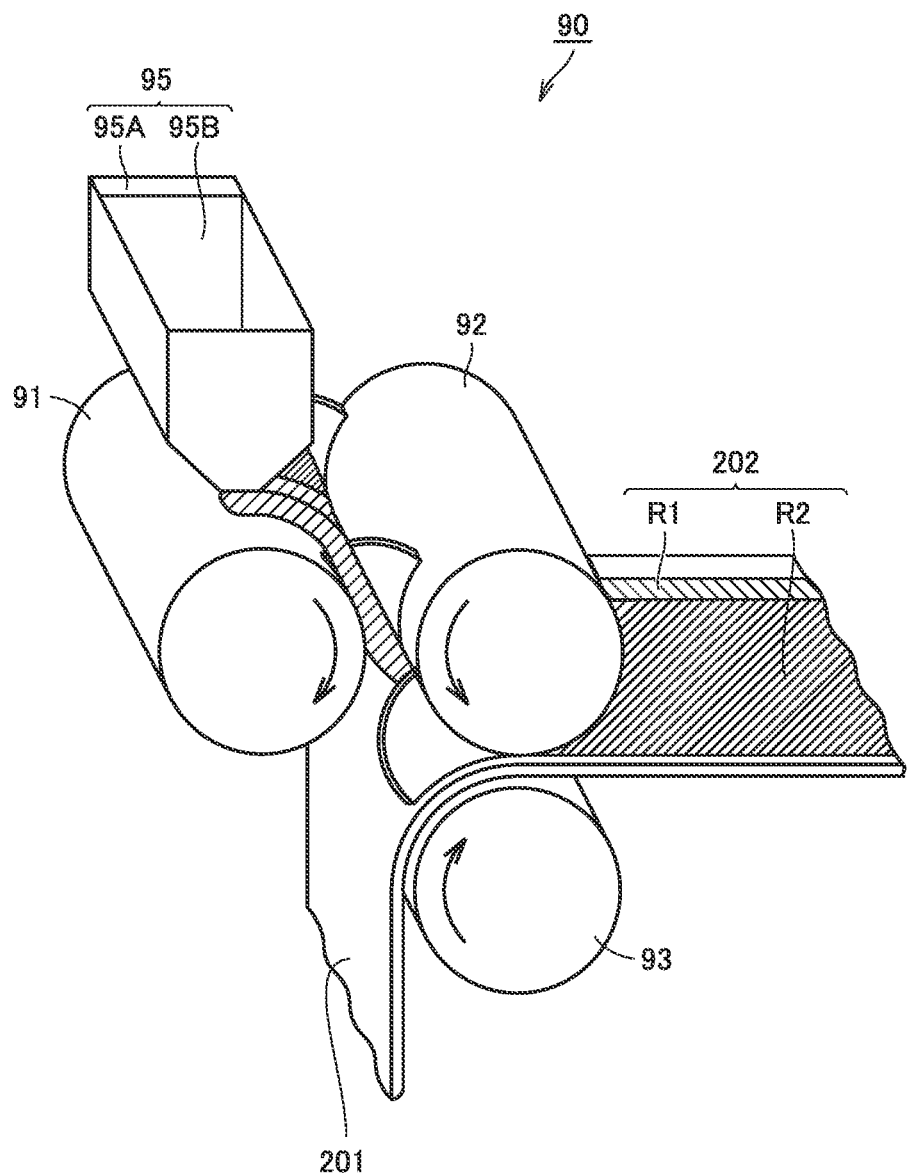
FIG. 6 is a schematic view illustrating a step of forming a first region and a second region.

FIG. 6 is a schematic view illustrating a step of forming first region R1 and second region R2. A negative electrode manufacturing apparatus 90 includes a supplying portion 95 and three rolls (an A roll 91, a B roll 92, and a C roll 93). A curved arrow illustrated in each of the rolls represents a rotation direction of the roll.

In supplying portion 95, a partition is provided at one position in a coating direction of a coating blade. Accordingly, supplying portion 95 is partitioned into a first region supplying portion 95A and a second region supplying portion 95B. The negative electrode active material including the Li-doped SiO is supplied to first region supplying portion 95A. Second region supplying portion 95B is supplied with the negative electrode active material including silicon oxide but containing no Li-doped SiO.

Supplying portion 95 supplies the negative electrode active materials and the binders to a gap between A roll 91 and B roll 92. A position corresponding to first region supplying portion 95A is supplied with the negative electrode active material including the Li-doped SiO as well as the binder. A position corresponding to second region supplying portion 95B is supplied with the negative electrode active material including silicon oxide but not containing the Li-doped SiO as well as the binder. In the gap between the A roll and the B roll, the mixtures of the negative electrode active materials and the binders are consolidated into the form of a sheet.

Next, the mixtures of the negative electrode active materials and the binders in the form of a sheet are disposed on a surface of negative electrode collector 201. As shown in FIG. 6, negative electrode collector 201 is conveyed on C roll 93 and is supplied to a gap between B roll 92 and C roll 93. Negative electrode collector 201 may be a sheet member such as a Cu foil, for example.

In the gap between B roll 92 and C roll 93, the mixtures of the negative electrode active materials and the binders in the form of a sheet are pressed against negative electrode collector 201, are separated from B roll 92, and are adhered to the surface of negative electrode collector 201. In this way, negative electrode composite material layer 202 including first region R1 and second region R2 can be formed on the surface of negative electrode collector 201. Then, in order to adjust the thickness and density of negative electrode composite material layer 202, a compression operation may be performed. The compression operation is performed using a roller, for example.

Finally, a slitter or the like is used to cut into a predetermined size, thereby completing negative electrode 200 shown in FIG. 4, for example.

<Separator>

Separator 300 electrically separates positive electrode 100 and negative electrode 200 from each other. For separator 300, a fine porous membrane is suitable, such as polyethylene (PE) or polypropylene (PP). Separator 300 may have a single-layer structure of PE, or may have a three-layer structure in which a PP membrane, a PE membrane, and a PP membrane are layered in this order. The thickness of separator 300 may be about 9 to 30 µm, for example. When separator 300 has the above-described three-layer structure, the thickness of the PE layer may be about 3 to 10 µm, and the thickness of the PP layer may be about 3 to 10 µm, for example. Separator 300 may include a heat-resistant layer on a surface thereof. The heat-resistant layer includes a heat-resistant material. Examples of the heat-resistant material include: metal oxide particles such as alumina; and a resin with a high melting point such as polyimide.

<Electrolyte Solution>

An electrolyte solution includes a solvent and a supporting electrolyte salt. The solvent is aprotic. The solvent may be a mixture of a cyclic carbonate and a chain carbonate, for example. A mixing ratio thereof may be, for example, as follows: the cyclic carbonate:the chain carbonate=1:9 to 5:5 (volume ratio). Examples of the cyclic carbonate include ethylene carbonate (EC), propylene carbonate (PC), and butylene carbonate (BC). Examples of the chain carbonate include ethyl methyl carbonate (EMC), dimethyl carbonate (DMC), diethyl carbonate (DEC), and the like. One of the cyclic carbonates and one of the chain carbonates may be used solely, or two or more of the cyclic carbonates and two or more of the chain carbonates may be used in combination. The supporting electrolyte salt may be $LiPF_6$, $LiBF_4$, $Li[N(FSO_2)_2]$, or the like, for example. In the electrolyte solution, the supporting electrolyte salt may have a concentration of 0.5 to 2.0 mol/l, for example. One of the supporting electrolyte salts may be used solely or two or more of the supporting electrolyte salts may be used in combination.

<Method for Manufacturing Battery>

The battery of the present embodiment can be manufactured by a manufacturing method described in the Examples mentioned below, for example. The manufacturing method of the present embodiment at least includes "preparation of positive electrode 100", "preparation of negative electrode 200", "preparation of separator 300", and "assembly of battery 1000".

<Application>

The battery illustrated in the present disclosure is used for a power supply for motive power in a hybrid vehicle (HV), a plug-in hybrid vehicle (PHV), an electric vehicle (EV), or the like, for example. However, the application of the battery illustrated in the present disclosure should not be limited to such a vehicle-related application. The battery illustrated in the present disclosure is applicable to any applications.

EXAMPLES

Hereinafter, Examples of the present disclosure will be described. However, the description below is not intended to limit the scope of claims.

<Manufacturing of Lithium Ion Secondary Battery>

Example 1

1. Preparation of Positive Electrode

The following materials were prepared.
Positive electrode active material: NCM
Conductive material: AB
Binder: PVdF
Solvent: N-methyl-2-pyrrolidone (NMP)
Positive electrode collector: Al foil (thickness=15 μm)

A planetary mixer was used to mix 92 parts by weight of NCM, 5 parts by weight of AB, 3 parts by weight of PVdF, and NMP. Accordingly, a positive electrode composite material paste was prepared. A solid content ratio of the positive electrode composite material paste was 65%. The positive electrode composite material paste was applied to surfaces (both front and rear surfaces) of positive electrode collector 101 using a die coater, and was then dried. Accordingly, positive electrode composite layer 102 was formed. Positive electrode composite layer 102 was rolled to have a predetermined density. In this way, positive electrode 100 was manufactured. Positive electrode 100 was cut into a predetermined dimension. It should be noted that positive electrode composite layer 102 was manufactured such that when viewed in a plan view, the area of negative electrode composite material layer 202 became larger than the area of positive electrode composite layer 102. In this way, positive electrode 100 was prepared.

2. Preparation of Negative Electrode

Negative electrode 200 was prepared in accordance with the following procedure.

<<Preparation of Silicon Oxide Doped with Li>>

The following materials were prepared.
Silicon oxide: SiO (powder)
Li source: LiH (powder)

SiO powder and LiH powder were mixed to prepare a powder mixture. The powder mixture was heated at 1000° C. for 60 minutes under an argon atmosphere. Then, the powder mixture was treated with hydrochloric acid to remove an impurity from the powder mixture. Accordingly, the powder mixture from which the impurity had been removed was obtained.

(Determination of Li-Doped SiO by XRD Measurement)

The powder mixture from which the impurity had been removed was placed on a holder to perform XRD measurement under below-described conditions. Accordingly, an X-ray diffraction pattern was obtained. A powder mixture in which the ratio of P1/P2 was more than or equal to 0.1 was determined as the Li-doped SiO, where P1 represents the peak height resulting from $LiSi_2O_5$ in which 2θ appears between 24.5° and 25° and P2 represents the peak height resulting from Si in which 2θ appears between 45° and 50°. Accordingly, the silicon oxide doped with Li was prepared.

Monochromator: graphite single crystal
Counter: scintillation counter
X ray: CuKα ray (wavelength of 1.54051 Å; tube voltage of 50 kV; tube current of 300 mA)
Measurement range: 2θ=10° to 90°
Scan speed: 10°/min
Step width: 0.02°
Measurement temperature: room temperature (25° C.)

<<Preparation of First Negative Electrode Composite Material Paste>>

The following materials were prepared.
Negative electrode active material: Li-doped SiO
Conductive aid: AB
Binder: polyimide
Solvent: water By mixing the Li-doped SiO, the AB, the polyimide, and the water, a first negative electrode composite material paste was prepared. A mixing ratio of the solid content is as follows: "Li-doped SiO:AB:polyimide=80:10:10 (mass ratio)".

<<Preparation of Second Negative Electrode Composite Material Paste>>

The following materials were prepared.
Negative electrode active material: SiO
Conductive aid: AB
Binder: polyimide
Solvent: water By mixing the SiO, the AB, the polyimide, and the water, a second negative electrode composite material paste was prepared. A mixing ratio of the solid content is "SiO:AB:polyimide=80:10:10 (mass ratio)".

<<Manufacturing of Negative Electrode>>

Negative electrode manufacturing apparatus 90 shown in FIG. 6 was prepared. By supplying the first negative electrode composite material paste to first region supplying portion 95A and supplying the second negative electrode composite material paste to second region supplying portion 95B, each paste was disposed on the surface of negative electrode collector 201. Then, by drying them, negative electrode composite material layer 202 including first region R1 and second region R2 was formed. It should be noted that a Cu foil (with a thickness of 12 μm) was used as negative electrode collector 201.

Negative electrode composite material layer 202 was rolled to have a predetermined density. In this way, negative electrode 200 was prepared. Negative electrode 200 was cut into a predetermined dimension. As shown in FIG. 4, when viewed in a plan view, negative electrode composite material layer 202 has a rectangular shape and first region R1 and second region R2 are formed to extend along longitudinal direction LD of negative electrode composite material layer 202.

As shown in FIG. 1, negative electrode 200 was manufactured such that first region R1 in negative electrode composite material layer 202 became a region that did not face positive electrode composite layer 102 and that extended from position A1 facing one end portion 102a of positive electrode composite layer 102 to one end portion 202a of negative electrode composite material layer 202 when battery 1000 was assembled. A distance (X1) from A1 to one end portion 202a of negative electrode composite material layer 202 was 0.1 mm.

3. Preparation of Separator and Assembly of Battery

Separator 300 in the form of a strip was prepared. Separator 300 had a thickness of 25 μm. Separator 300 had a three-layer structure. That is, separator 300 is constructed by layering a porous membrane composed of PP, a porous membrane composed of PE, and a porous membrane composed of PP in this order.

That is, electrode array 40 was manufactured by: layering positive electrode 100, separator 300, negative electrode 200, and separator 300 in this order; and winding them in the form of a spiral. A case having a cylindrical shape was prepared. Electrode array 400 was stored in case 1001.

An electrolyte solution having the following composition was prepared.

Solvent: [EC:DMC:EMC=3:4:3 (volume ratio)]

Supporting electrolyte: LiPF$_6$ (1 mol/l)

The electrolyte solution was injected into case 1001. Case 1001 was sealed. In this way, a lithium ion secondary battery according to an Example 1 was manufactured. This lithium ion secondary battery has a rated capacity of 1 Ah.

Examples 2 to 5

Each of lithium ion secondary batteries 1000 was manufactured in the same manner as in Example 1 except that the value of X1 mm (FIG. 1 and the like), which defined first region R1, was changed as shown in Table 1 below.

Comparative Example 1

A lithium ion secondary battery 1000 was manufactured in the same manner as in Example 1 except that no Li-doped SiO was included in negative electrode composite material layer 202 as shown in Table 1 below. That is, negative electrode composite material layer 202 includes silicon oxide as the negative electrode active material but includes no Li-doped SiO.

Comparative Examples 2 and 3

Each of lithium ion secondary batteries 1000 was manufactured in the same manner as in Example 1 except that the value of X1 mm (FIG. 1 and the like), which defined first region R1, was changed as shown in Table 1 below.

<Evaluation>

1. Measurement of Initial Capacity

The battery was charged to 4.1 V at a current value of 0.1 C under an environment of 25° C. in accordance with a constant current constant voltage (CCCV) method. Then, CC discharging was performed at 0.1 C until the voltage reached 3.0 V. This CC discharging capacity was regarded as initial capacity. It should be noted that the discharging at 1 C refers to discharging at a discharging current [A] with which it takes one hour to reach a rated discharging voltage. With the initial capacity of Comparative Example 1 being regarded as 1, relative evaluation was made on the respective initial capacities of the batteries according to the Examples and the Comparative Examples. Results are shown in the column "Initial Capacity" in Table 1 below. It is indicated that as the value shown in the column "Initial Capacity" is larger, the initial capacity of the battery is larger.

2. Measurement of Capacity Retention after 100 Cycles 100 charging/discharging cycles were repeated between 3.0 V to 4.1 V at a current value of 2 C under an environment of 25° C. After the 100 cycles, a discharging capacity was measured under the same conditions as those for the measurement of the initial capacity. By dividing the discharging capacity after the 100 cycles by the initial capacity, the capacity retention after the 100 cycles was calculated. Results are shown in the column "Capacity Retention" in Table 1 below. It is indicated that as the value shown in the column "Capacity Retention" is larger, reduction of the battery capacity after the 100 cycles is more suppressed.

TABLE 1

| | Li-doped SiO | X1 [mm] | Initial Capacity | Evaluation Capacity Retention [%] |
|---|---|---|---|---|
| Example 1 | Included | 0.1 | 0.99 | 74 |
| Example 2 | Included | 1 | 1.02 | 77 |
| Example 3 | Included | 2 | 1.04 | 78 |
| Example 4 | Included | 4 | 1.07 | 84 |
| Example 5 | Included | 10 | 1.04 | 75 |
| Comparative Example 1 | Not Included | — | 1 | 70 |
| Comparative Example 2 | Included | 15 | 0.96 | 71 |
| Comparative Example 3 | Included | 20 | 0.93 | 68 |

<Results>

The capacity retentions of the Examples were higher than those of the Comparative Examples. That is, it was indicated that there is provided a lithium ion secondary battery in which decrease in capacity retention is suppressed and which includes a negative electrode containing silicon oxide doped with lithium. In each of the Examples, in first region R1 of negative electrode composite material layer 202, the Li-doped SiO was included as the negative electrode active material. That is, lithium had been already included in first region R1 in the stage before the initial charging. Accordingly, it is considered that during the initial charging/discharging, current density in one end portion 102*a* of positive electrode composite layer 102 was reduced. As a result, it is considered that decrease in capacity retention was suppressed.

From the results of Examples 2 to 4, it is understandable that decrease in capacity retention is significantly suppressed when first region R1 is a region that does not face positive electrode composite layer 102 and that extends from position A1 facing one end portion 102*a* of positive electrode composite layer 102 to a point separated from position A1 by more than or equal to 1 mm and less than or equal to 4 mm.

In Comparative Example 1, the capacity retention was low. It is considered that since no Li-doped SiO was contained in negative electrode composite material layer 202, the current density in one end portion 102*a* of positive electrode composite layer 102 was not reduced during the initial charging/discharging.

In each of Comparative Examples 2 and 3, the capacity retention was low. In each of these examples, X1 mm was more than 10 mm (FIG. 1 and the like). That is, the absolute quantity of the Li-doped SiO included in negative electrode composite material layer 202 was large. It is considered that the Li-doped SiO does not contribute to increase of the battery capacity as compared with silicon oxide not doped with Li. Since the Li-doped SiO was increased in negative electrode composite material layer 202, the initial capacity might be decreased to result in insufficient suppression of decrease in the capacity retention.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A lithium ion secondary battery comprising a positive electrode, a negative electrode, and a separator, wherein
   the positive electrode at least includes a positive electrode composite layer containing a positive electrode active material, the negative electrode at least includes a negative electrode composite material layer containing a negative electrode active material, a whole of the positive electrode composite layer and a portion of the negative electrode composite material layer face each other with the separator being interposed between the positive electrode composite layer and the negative electrode composite material layer, the negative electrode composite material layer includes at least one first region and a second region, the first region is a region that does not face the positive electrode composite layer and that extends from a position facing one end portion of the positive electrode composite layer to a point separated from the position by more than or equal to 0.1 mm and less than or equal to 10 mm, the second region is a region other than the first region, wherein the second region faces the positive electrode composite layer, the first region includes, as the negative electrode active material, silicon oxide doped with lithium, and the second region includes, as the negative electrode active material, silicon oxide that is not doped with lithium.

2. The lithium ion secondary battery according to claim 1, wherein the negative electrode composite material layer has two said first regions.

3. The lithium ion secondary battery according to claim 1, wherein when viewed in a plan view, the negative electrode composite material layer has a rectangular shape, and the first region and the second region extend along a longitudinal direction of the negative electrode composite material layer.

4. The lithium ion secondary battery according to claim 1, wherein when viewed in a plan view, an area of the negative electrode composite material layer is larger than an area of the positive electrode composite layer.

5. A method for manufacturing the lithium ion secondary battery recited in claim 1, the method at least comprising:
preparing the positive electrode;
preparing the negative electrode;
preparing the separator; and
assembling the lithium ion secondary battery including the positive electrode, the negative electrode, and the separator.

6. The method according to claim 5, wherein the preparing the negative electrode includes supplying the negative electrode active material including the Li-doped silicon oxide to the first region and supplying the negative electrode active material including silicon oxide without Li-doped silicon oxide to the second region.

* * * * *